United States Patent
Jin et al.

(10) Patent No.: US 8,548,379 B2
(45) Date of Patent: Oct. 1, 2013

(54) CALIBRATION-LESS TRANSMIT BEAMFORMING

(75) Inventors: Hang Jin, Plano, TX (US); John Grabner, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 591 days.

(21) Appl. No.: 12/543,566

(22) Filed: Aug. 19, 2009

(65) Prior Publication Data

US 2011/0045787 A1  Feb. 24, 2011

(51) Int. Cl.
*H04B 5/00* (2006.01)

(52) U.S. Cl.
USPC ........................................................ 455/41.1

(58) Field of Classification Search
USPC ........................................................ 455/41.2
See application file for complete search history.

(56) References Cited

U.S. PATENT DOCUMENTS

| 6,735,182 | B1* | 5/2004 | Nishimori et al. ............ 370/294 |
| 7,031,669 | B2 | 4/2006 | Vaidyanathan et al. |
| 7,209,078 | B2 | 4/2007 | Jin et al. |
| 2006/0079290 | A1* | 4/2006 | Seto et al. .................. 455/562.1 |

* cited by examiner

*Primary Examiner* — Fayyaz Alam
*Assistant Examiner* — David Bilodeau
(74) *Attorney, Agent, or Firm* — Edell, Shapiro & Finnan, LLC

(57) ABSTRACT

A calibration-less transmit beamforming apparatus and method are provided. In a wireless communication device that comprises a plurality of antennas, a gain block is provided in the front-end module associated with each antenna and the same gain block is used during transmit and receive operations. As a result, the transmit phase offset and receive phase offset for each antenna are made to be equal, thereby achieving conditions for transmit beamforming without the need for complex antenna calibration algorithms and hardware.

23 Claims, 5 Drawing Sheets

CALIBRATION-LESS TRANSMIT BEAMFORMING

TECHNICAL FIELD

The present disclosure relates to wireless communication devices and systems and more particularly to transmit beamforming wireless communication methods.

BACKGROUND

In wireless communication systems, transmit beamforming techniques are employed to improve the reliability and throughput of a wireless link between one device having a plurality of antennas and another device. When transmit beamforming one or more signals, multiple copies of the transmitted signal(s) are sent from multiple antennas and the signals supplied to the respective antennas are weighted (in magnitude and phase) in such a way that they will be optimally combined at the intended receiver device. The antenna weights to be applied to the copies of the transmit signal are extracted from phase and magnitude information of signals received from the other device. Therefore, in order to achieve the benefits of transmit beamforming, the receive and transmit channels need to be symmetric, and the phase and magnitude differences between the receivers and transmitters in the device doing the transmit beamforming need to compensated.

There are numerous antenna calibration techniques available, but all of them rather complex computations, intricate procedures for measurements and/or specific hardware to achieve the desired compensation.

DESCRIPTION OF EXAMPLE EMBODIMENTS

Overview

A calibration-less transmit beamforming apparatus and method are provided. The apparatus is a wireless communication device that comprises a plurality of antennas; a plurality of gain blocks each associated with a corresponding one of the plurality of antennas and a plurality of switch networks each associated with a corresponding one of the plurality of gain blocks. The same gain block in the front-end module associated with each antenna is used during transmit and receive operations. As a result, the transmit phase offset and receive phase offset for each antenna are made to be equal, thereby achieving conditions for transmit beamforming without the need for complex antenna calibration algorithms and hardware.

A corresponding method is also provided whereby in a transmit mode, corresponding ones of a plurality of transmit signals are amplified with each of a plurality of gain blocks to produce a plurality of amplified transmit to be transmitted substantially simultaneously by respective ones of the plurality of antennas. In a receive mode, corresponding ones of a plurality of receive signals detected by respective ones of the plurality of antennas are amplified with each of the plurality of gain blocks.

Example Embodiments

Figure 1:
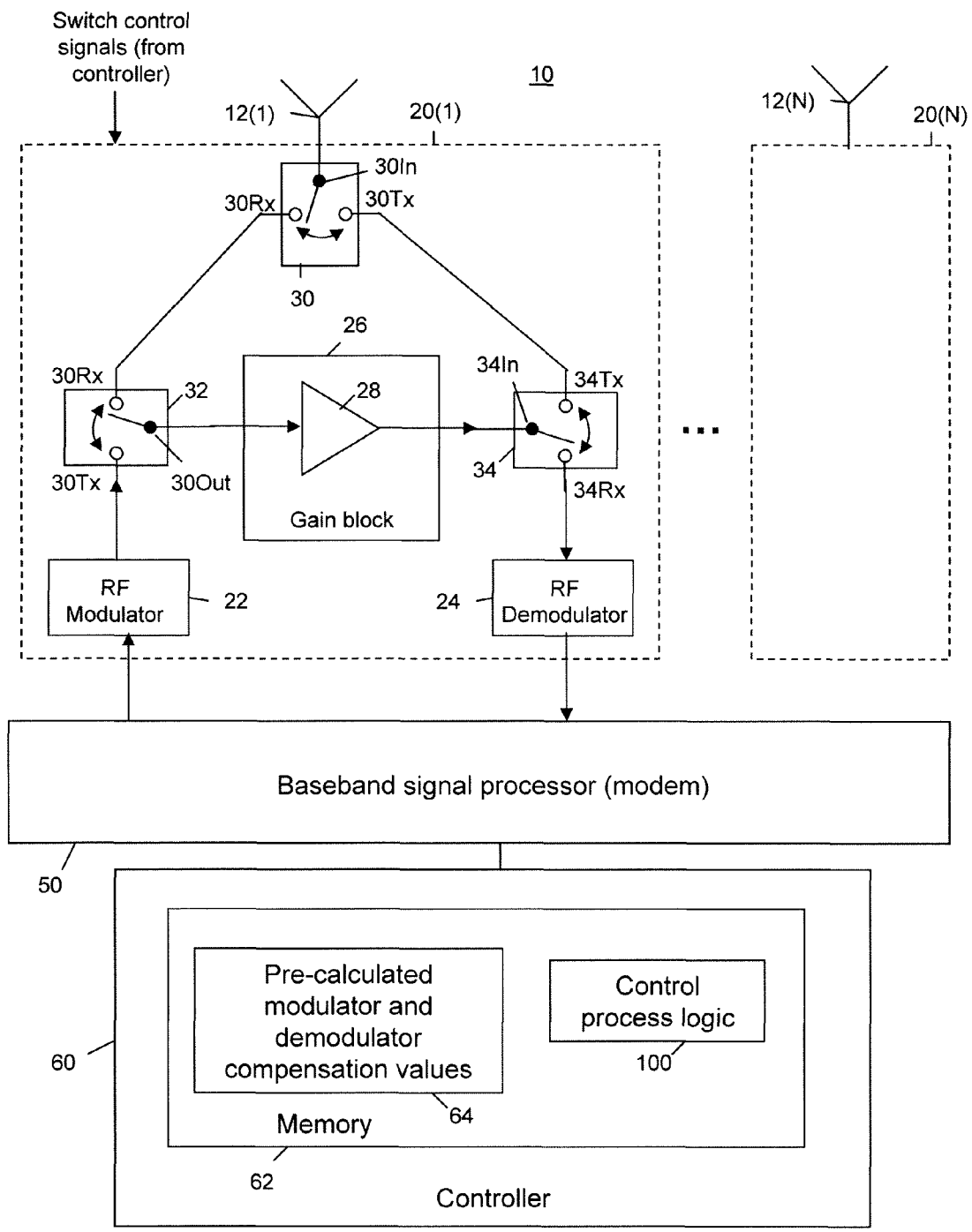
FIG. 1 is block diagram of a wireless communication device configured to achieve calibration-less transmit beamforming.

Referring first to FIG. 1, a description is provided of a wireless communication device 10 that is configured or equipped to perform calibration-less transmit beamforming. The device 10 comprises a plurality of antennas 12(1)-12(N), a plurality of radio frequency (RF) front-end modules 20(1)-20(N), each connected to a corresponding one of the antennas 12(1)-12(N), a baseband signal processor, e.g., modem, 50 and a controller 60. Each RF front-end module 20(1)-20(N) comprises an RF modulator or upconverter 22, an RF demodulator or downconverter 24, a gain block 26 comprising at least one amplifier 28 and a switch network comprising switches 30, 32 and 34. The baseband signal processor 50 performs the baseband signal processing of baseband signals to be transmitted and of receive signals. When transmit beamforming techniques are employed, a signal (or multiple signals) is weighted in magnitude and phase by a corresponding one of N antenna weights to produce N weighted transmit signals to be simultaneously transmitted via corresponding ones of the antennas 12(1)-12(N). Thus, the baseband signal processor 50 generates the appropriately formatted baseband transmit signal(s) and also applies the antenna weights to the baseband transmit signal(s) to produce a plurality of weighted transmit signals, a corresponding one of which is supplied to the RF modulator 22 of an RF front-end module 20(1)-20(N). The RF modulator 22 is configured to upconvert a baseband transmit signal to a transmission frequency to produce an RF transmit signal. Thus, the RF modulator 22 is an example of a means for modulating a baseband transmit signal to produce an RF transmit signal. The RF modulator 22 may use direct-conversion techniques (directly from baseband to the RF transmission frequency) or indirect-conversion techniques (from baseband to an intermediate frequency, and then from an intermediate frequency to the RF transmission frequency).

Likewise, in the receive direction, a signal or signals detected by each of the antennas 12(1)-12(N) is downconverted to a baseband receive signal by the RF demodulator 24 in the RF front-end modules and the plurality of baseband receive signals are then processed (e.g., weighted and combined) and then baseband demodulated in order to recover information carried in the received signal(s). The RF demodulator 24 is an example of a means for demodulating an RF receive from to produce a baseband receive signal. The RF demodulator 24 may use a direct conversion architecture (directly to baseband from RF) or an indirect conversion architecture (from RF to an intermediate frequency and then from the intermediate frequency to baseband).

It should be understood that there are analog-to-digital converters (ADCs) and digital-to-analog converters (DACs) in the various signal paths to convert between analog and digital signals.

The controller 60 is, for example, a signal or data processor that comprises a memory 62 or other data storage block that stores data used for the techniques described herein. The memory 62 may be separate or part of the controller 60. Instructions associated with control process logic 100 may be stored in the memory 62 for execution by the controller 60. In addition, pre-calculated modulator and demodulator compensation values shown at 64 are stored in the memory 62.

The functions of the controller 60 may be implemented by logic encoded in one or more tangible media (e.g., embedded logic such as an application specific integrated circuit, digital signal processor instructions, software that is executed by a processor, etc.), wherein the memory 62 stores data used for the computations described herein and stores software or processor instructions that are executed to carry out the computations described herein. Thus, the process logic 100 may take any of a variety of forms, so as to be encoded in one or more tangible media for execution, such as with fixed logic or programmable logic (e.g., software/computer instructions executed by a processor) and the controller 60 may be a programmable processor, programmable digital logic (e.g., field programmable gate array) or an application specific integrated circuit (ASIC) that comprises fixed digital logic, or a combination thereof. For example, the controller 18 may be a modem in the base station and thus be embodied by digital logic gates in a fixed or programmable digital logic integrated circuit, which digital logic gates are configured to perform the process logic 100. The control process logic 100 is described hereinafter in conjunction with FIG. 3.

According to the techniques described herein, the amount of calibration required in order to support transmit beamforming between wireless communication devices is greatly reduced by having the transmit signal path and receive signal path for each antenna share a substantial or significant portion of the hardware signal processing "chain". Thus, as shown in FIG. 1, the same gain block (gain circuit) 26 is used in the transmit signal path and receive signal path for each antenna. The response of the gain block 26 changes (in amplitude and phase) with temperature, frequency and time. However, since the same gain block is used in both the transmit and receive directions, it is not necessary to determine calibration or compensation values for it. The gain of the gain block 26 is configured to accommodate the requirements of both receive and transmit functions of the device 10.

To this end, the gain block 26 is configured to operate in either of first and second gain modes, where the first gain mode is a transmit mode and the second gain mode is a receive mode. In the first gain mode, the gain block 26 is configured to amplify with a first gain a transmit signal, output by the RF modulator 22, to be transmitted for its associated antenna. In the second gain mode, the gain block 26 is configured to amplify with a second gain a receive signal received by its associated antenna.

Referring still to FIG. 1, the switch network is an example of a means for switching and, comprises, in one example, a first switch 30, a second switch 32 and a third switch 34. The switching network is configured to operate in either a first switch mode or a second switch mode. Each switch 30, 32 and 34 comprises first, second and third terminals. That is, switch 30 comprises a receive terminal 30Rx, a transmit terminal 30Tx and an input terminal 30In. The input terminal 30In is connected to its associated antenna, e.g., antenna 12(1). Switch 32 comprises a transmit terminal 32Tx, a receive terminal 32Rx and an output terminal 32out. Switch 34 comprises a transmit terminal 34Tx, a receive terminal 34Rx and an input terminal 34In. The transmit terminal 32Tx of the second switch 32 is connected to an output of the RF modulator 22, the receive terminal 32Rx of the second switch 32 is connected to the receive terminal 30Rx of the first switch 30 and the output terminal 32 Out of switch 32 is connected to an input of the gain block 26. The transmit terminal 34Tx of the switch 34 is connected to the transmit terminal 30Tx of switch 30, the receive terminal 34Rx is connected to the input of the RF demodulator 24 and the input terminal 34In of switch 34 is connected to an output of the gain block 26. The controller 60 or baseband signal processor 50 supplies switch control signals to each of the RF front-end modules to control the state of the switches 30, 32 and 34 of the switch networks in each of the RF front-end modules.

Figure 2:
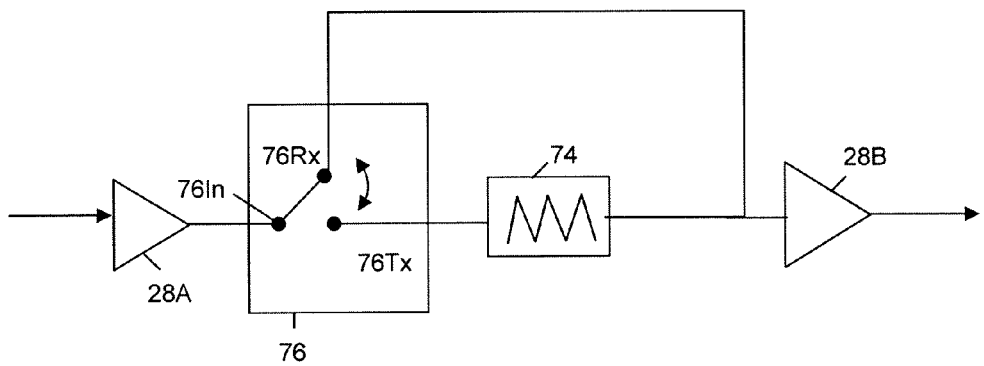
FIG. 2 is a block diagram of an example of a configurable gain block used in a front-end module of the wireless communication device shown in FIG. 1.

Reference is now made to FIG. 2 for a description of one example of the gain block 26. The gain block 26 is an example of a means for amplifying a baseband transmit signal or an RF received signal. In this example, the gain block 26 comprises a first amplifier 28A, a second amplifier 28B, an attenuator element 74 and a switch 76. The switch 76 comprises a transmit terminal 76Tx, a receive terminal 76Rx and an input terminal 76In connected to an output of the first amplifier 28A. The transmit terminal 76Tx is connected to an input of the attenuator element 74 and the receive terminal 76Rx is connected to the input of the second amplifier 28B. The switch 76 is responsive to a switch control signal from the controller 60 or baseband signal processor 50 to select the transmit terminal 76Tx in the first gain mode (transmit mode) and to select the receive terminal 76Rx in the second gain mode (receive mode). In the receive mode, the receive signal is amplified by the first amplifier 28A and the second amplifier 28B (without attenuation by the attenuator element 74), whereas in the transmit mode, the transmit signal is amplified by the first amplifier 28A, attenuated by the attenuator element 74 and then amplified by the second amplifier 28B. Thus, greater amplification is achieved in the receive mode than in the transmit mode, as is desired.

For example, for transmit amplification, the output power from the RF modulator 22 is at −20 dBm, and the output power of delivered to an antenna is 30 dBm. Thus, the gain block 26 would require a gain of 50 dB in the transmit mode. For receive amplification, the receiver sensitivity is −80 dBm and an input to the RF demodulator 24 is to be −20 dBm. The gain in the receive mode needs to be 60 dB. To achieve a first gain of 50 dB for the transmit mode and 60 dB for the receive mode, the first and second amplifiers 28A and 28B are both designed to have a gain of 30 dB, and the attenuator element is designed to have an attenuation of 10 dB. The attenuator element 76 is, for example, a resistor and it may be embodied as a resistive trace or path on a circuit board or in an integrated circuit, and thus may be implemented precisely and consistently across all of the RF front-end modules. The attenuator element (10 dB) is coupled into the signal path only during the transmit mode, as described above. In this example, the total gain of the gain block 26 in the receive mode is 30 dB+30 dB=60 dB and in the transmit mode is 30 dB−10 dB+30 dB=50 dB.

Generally, gain block 26 comprises at least one amplifier, an attenuator element and a switch configured to connect the attenuator element into and out of a signal path of the gain block (first and second amplifiers 28A and 28B) depending on whether the gain block is in the first gain mode or second gain mode. It should be understood that it is not necessary for there be two amplifiers as shown in FIG. 2. A single amplifier, an attenuator element and a switch that switches that attenuator element into and out of the signal path of the single amplifier may also suffice for the gain block 26.

The amplifier(s) in the gain block that deliver the required transmitter output power may present some non-linearity, e.g., distortion due to amplitude modulation-phase modulation (AM-PM) and/or due to amplitude modulation to amplitude modulation (AM-AM). Non-linearity behavior can make an amplifier present with different phase and gain at different drive levels. So, theoretically, to make this scheme described herein work, the amplifier would need to be driven to the same level during both transmit and receive periods, such that the signals would experience the same gain and phase during both the transmit and receive modes. This would lead to unnecessary overdrive of the amplifier, causing excessive direct current (DC) consumption during the receive mode. Fortunately, this would not happen in reality because the linearity requirements for the amplifier are very high for many applications, such as WiMAX™ systems. As a result, the amplifier needs to operate in a class A or slight AB mode, in which little AM-PM and AM-AM distortion occurs. Thus, the gain and phase of the amplifier with high linearity requirements depend little on the drive level.

Even if the linearity requirements for a given application are not that stringent, as is the case in a WiFi™ system, the scheme described herein is viable because most of the non-linearity would occur as AM-AM non-linearity, which has little impact on transmit beamforming gain as long as the phase variations across the antenna paths are properly compensated.

The RF modulator 22, RF demodulator 24 (including their associated baseband filters, drivers and variable gain amplifiers) are relatively low power devices. Their gain and phase responses behave very consistently over temperature and frequency, and do not change over time when the device 10 is deployed in the field for use. Thus, to compensate for their variations, the pre-calculated demodulator compensation values 64 (FIG. 1) may be used by the baseband signal processor 50 when processing received signals and transmit signals to apply gain and phase adjustments to respective transmit and receive signals in accordance with the calibration values. That is, during the transmit mode, the calibration values are used to apply gain and phase adjustments to respective transmit signals and in the receive mode, the calibration values are used to apply gain and phase adjustments to respective receive signals. While the pre-calculated demodulator compensation values 64 are shown as being stored in the controller 60, they may instead be stored in the baseband signal processor 50.

Figure 3:
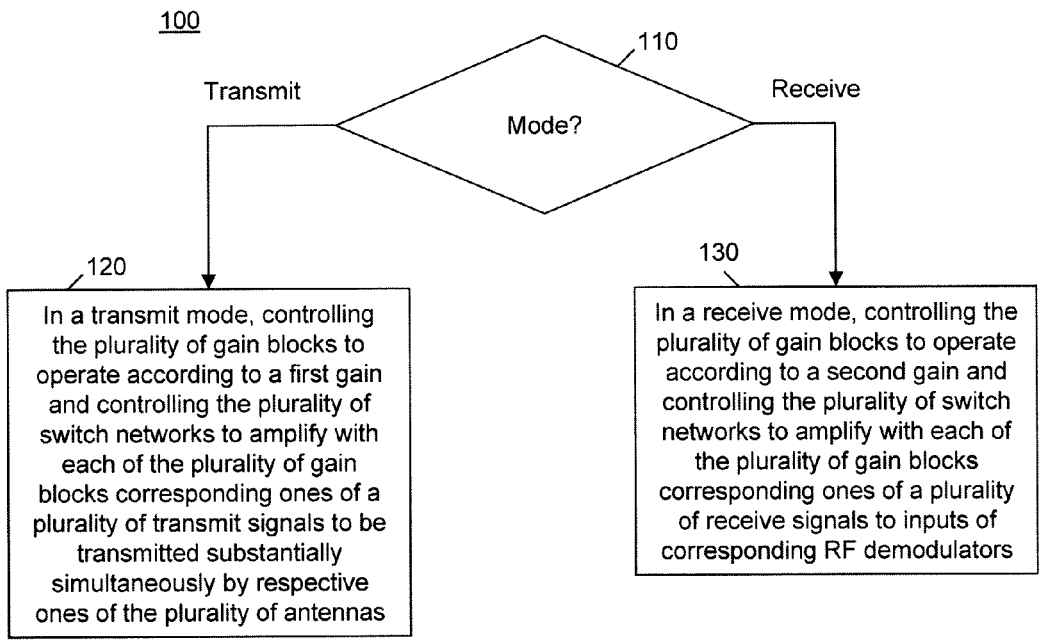
FIG. 3 is a flow chart of control process logic used in the wireless communication device shown in FIG. 1.

Turning to FIG. 3, the control process logic 100 is described with reference to FIGS. 4 and 5, respectively. In a time division duplex (TDD) system, the device 10, at any given period of time, is either in the transmit mode or receive mode, but not transmitting and receiving at the same time. At 110, the mode of the device 10 is determined, either transmit mode (referred to above as the first mode) or receive mode (referred to above as the second mode). When the device 10 is in the transmit mode, then at 120, the plurality of gain control blocks are controlled to operate according to a first gain and the switch control signals are generated to control the plurality of switch networks to amplify with each of the plurality of gain blocks corresponding ones of a plurality of transmit signals to produce amplified RF transmit signals be transmitted substantially simultaneously by respective ones of the plurality of antennas.

Figure 4:
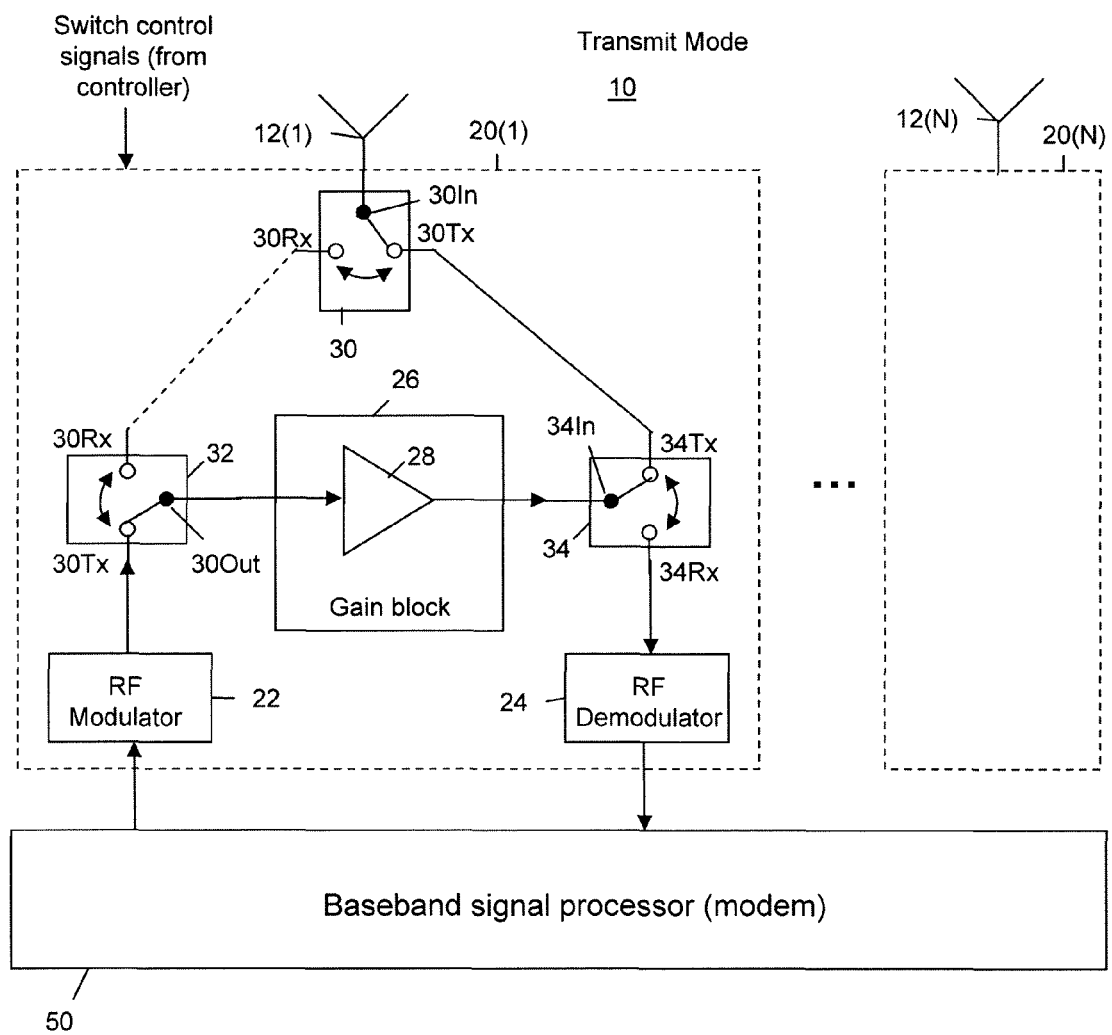
FIG. 4 is a block diagram of the wireless communication device configured in a transmit mode.

FIG. 4 illustrates the configuration of the RF front-end modules when the device 10 is in the transmit mode. The switch control signals supplied to the RF front-end modules 20(1)-20(N) are configured to cause the switches 30, 32 and 34 to operate in first switch mode in which switch 30 connects to terminal 30Tx, switch 32 connects to terminal 32Tx and switch 34 connects to terminal 34Tx. As a result, in the first switch mode, the switch network is configured to couple a transmit signal output from the RF modulator 22 to an input of the gain block 26 (via switch 32). The gain block 26, operating in the first gain mode, is configured to amplify the RF transmit signal with a first gain to produce an amplified RF transmit signal. The switch 34 is configured and to couple or direct the amplified transmit signal from the output of the gain block 26 to the antenna, e.g., antenna 12(1) associated with RF front-end module 20(1).

When at 110 the device is determined to be in the receive mode, then at 130, the plurality of gain blocks are controlled to operate according to a second gain and switch control signals are configured to control the plurality of switch networks to amplify with each of the gain blocks corresponding ones of a plurality of receive signals received by the plurality of antennas.

Figure 5:
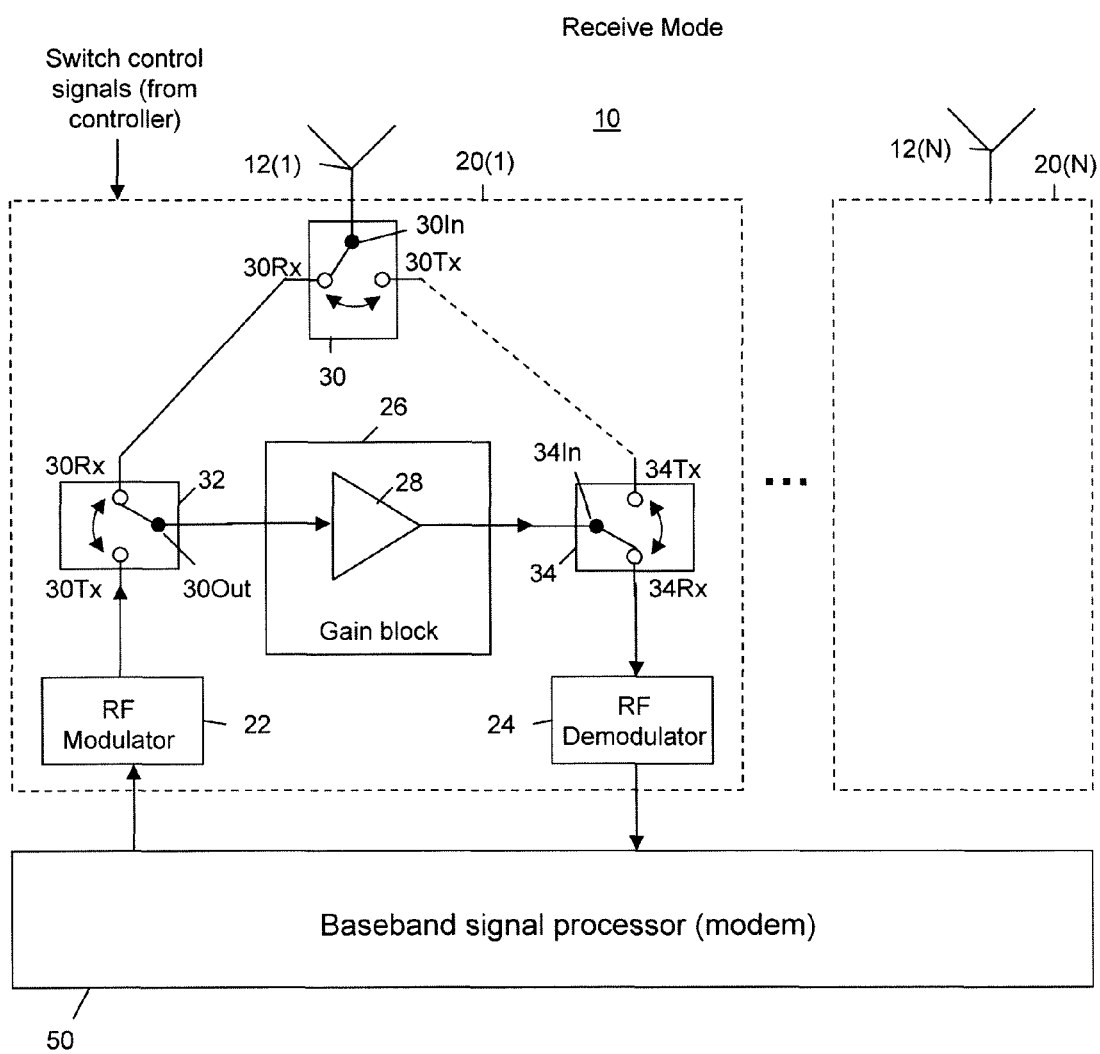
FIG. 5 is a block diagram of the wireless communication device configured in a receive mode.

FIG. 5 illustrates the configuration of RF front-end modules 20(1)-20(N) in the receive mode. In the receive mode, the switch control signals are configured to cause the switches 30, 32 and 34 to operate in accordance with the second switch mode in which switch 30 connects to terminal 30Rx, switch 32 connects to terminal 32Rx and switch 34 connects to terminal 34Rx. Consequently, switch 30 couples a receive signal from the antenna 12(1) to an input of the gain block 26 via switch 32. The gain block 26, operating in the second gain mode is configured to amplify the receive signal with a second gain to produce an amplified receive signal, and switch 34 couples the amplified receive signal from the output of the gain block 26 to the input of the RF demodulator 24.

Thus, the same gain block 26 is used for both transmit and receive functions in each of the RF front-end modules 20(1)-20(N) associated with antennas 12(1)-12(N). As a result, for each RF front-end module, the phase offset during transmission is equal to the phase offset during reception.

Figure 6:
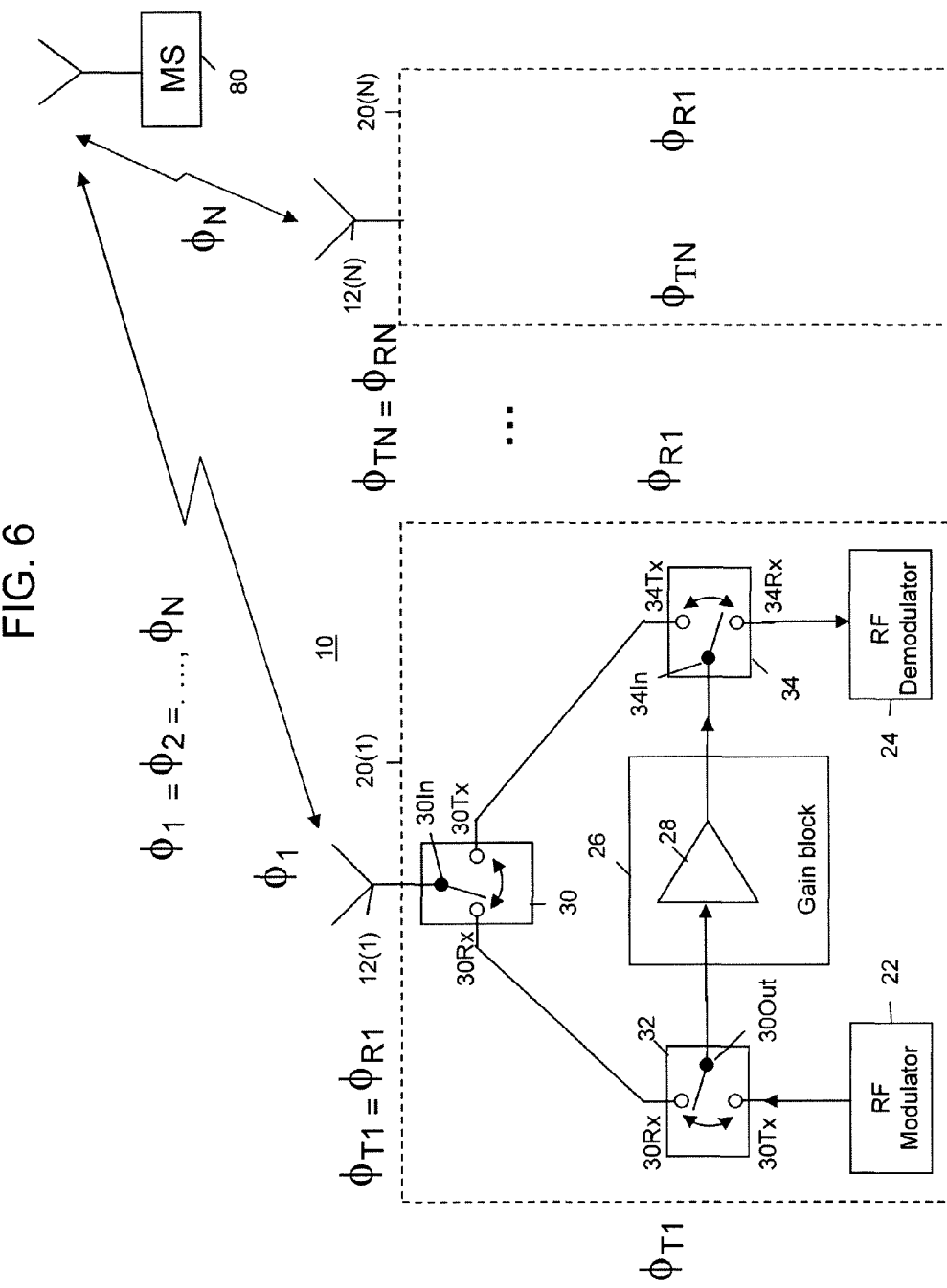
FIG. 6 is a block diagram illustrating an example of calibration-less transmit beamforming from the wireless communication device shown in FIG. 1 to another device.

Turning now to FIG. 6, a block diagram is shown to illustrate the benefits of the calibration-less transmit beamforming techniques depicted above in connection with FIGS. 1-5. In the example shown in FIG. 6, the wireless communication device 10 is communicating with a mobile station (MS) 80. The device 10 receives a transmission from the MS 80. In this example, it is assumed, for simplicity, that the signals received on the N antennas of the device 10 have the same magnitude and that the transmit and receive chains within each RF front-end modules 20(1)-20(N) have the same gain. Thus, only phase variation and compensation is considered in this example. $\phi_1$-$\phi_N$ are the phase delay of the over the air wireless links associated with antennas 12(1)-12(N) to the antenna of the MS 80, $\phi_{T1}$-$\phi_{TN}$ are the phase shifts of the RF modulators in the device 10, and $\phi_{R1}$-$\phi_{RN}$ are the phase shifts of the receivers in the device 10.

A simple case is taken were N=2 for the example of FIG. 6. When the device 10 receives a signal from the MS 80, it extracts the phase information $\phi_1'=\phi_1+\phi_{R1}$ and $\phi_2'=\phi_2+\phi_{R2}$. Since the channel is TDD and is assumed to be symmetrical (in both directions between the device 10 and MS 80), transmit beamforming from device 10 to MS 80 is performed by inverting the phases of the received signal such that the phase of the first transmit signal to be transmitted from antenna 12(1) is $-\phi_1'=-(\phi_1+\phi_{R1})$ and the phase of the second transmit signal to be transmitted from antenna 12(2) is $-\phi_2'=-(\phi_2+\phi_{R2})$. After the first and second transmit signals pass through the transmit chains (e.g., RF modulators in the RF front-end modules 20(1) and 20(2)) and the over-the-air link to the MS 80, the phases at the MS receiver antenna are:

$$\phi1=\phi1+\phi T1-\phi1'=\phi1+\phi T1-(\phi1+\phi R1)=\phi T1-\phi R1$$

$$\phi2=\phi2+\phi T2-\phi2'=\phi2+\phi T2-(\phi2+\phi R2)=\phi T2-\phi R2$$

When the phase differences between the transmitter and receiver within each RF front-end module is not taken into account, then signals at the antenna of the MS will be out of phase as indicated by the equations above. In the configurations described herein where the transmit and receive signal paths in the RF front-end module share a gain block, the result is that the receiver phase offset and transmitter phase offset within each RF front-end module is equal, that is, $\phi T1=\phi R1$, $\phi T2=\phi R2$, and so on. Consequently, the phases at the MS antenna are equal, that is, $\phi 1=\phi 2$, etc. This is the desired result for transmit beamforming and it is achieved without complex antenna calibration schemes, computations and hardware.

Although the apparatus and method are illustrated and described herein as embodied in one or more specific examples, it is nevertheless not intended to be limited to the details shown, since various modifications and structural changes may be made therein without departing from the scope of the apparatus and method and within the scope and range of equivalents of the claims.

What is claimed is:

1. An apparatus comprising:
    a plurality of antennas;
    a plurality of gain blocks each associated with a corresponding one of the plurality of antennas, each gain block having an input, an output, and at least a first amplifier;
    a processor configured to supply respective transmit signals to the plurality of antennas via the plurality of gain blocks and to receive respective receive signals from the plurality of antennas via the plurality of gain blocks;
    a plurality of switch networks each associated with a corresponding one of the plurality of gain blocks, wherein each switch network is configured to operate in either of first and second switch modes, wherein in the first switch mode each switch network is configured to couple a transmit signal to the input of its associated gain block and to couple an amplified transmit signal from the output of its associated gain block to the antenna for the associated gain block such that the first amplifier of the associated gain block lies in a transmit signal path between the processor and the antenna for the associated gain block, and in the second switch mode each switch network is configured to couple a receive signal from the antenna for its associated gain block to the input of the associated gain block and to couple an amplified receive signal from the output of its associated gain block to a receive signal path to the processor such that the first amplifier of the associated gain block lies in the receive signal path between the antenna for the associated gain block and the processor; and
    a controller configured to control the plurality of gain blocks and the plurality of switch networks, wherein in a transmit mode the controller is configured to control each of the plurality of switch networks to operate in the first switch mode so as to cause the plurality of gain blocks to amplify a plurality of transmit signals for transmission substantially simultaneously via the plurality of antennas and in a receive mode the controller is configured to control each of the plurality of switch networks to operate in the second switch mode so as to cause the plurality of gain blocks to amplify a plurality of receive signals received by the plurality of antennas.

2. The apparatus of claim 1, wherein each gain block is configured to operate in either of first and second gain modes, wherein in the first gain mode each gain block is configured to amplify with a first gain and in the second gain mode is configured to amplify with a second gain, and wherein the controller is configured to control each gain block to operate in the first gain mode when in the transmit mode and to operate in the second gain mode when in the receive mode.

3. The apparatus of claim 2, wherein each of the plurality of gain blocks further comprises a second amplifier, an attenuator, and a gain switch configured to selectively connect the attenuator element into and out of a signal path of the gain block, and wherein the gain switch is configured to selectively connect the attenuator element between the first and second amplifiers depending on whether the gain blocks are in the first or second gain modes.

4. The apparatus of claim 2, wherein each of the plurality of gain blocks is configured to generate the first gain in the first gain mode which is less than the second gain generated in the second gain mode.

5. The apparatus of claim 3, wherein the gain switch in each of the plurality of gain blocks is configured to connect the attenuator element into the signal path of the gain block during the first gain mode and to disconnect the attenuator element from the signal path during the second gain mode.

6. The apparatus of claim 1, and further comprising a radio frequency (RF) modulator and an RF demodulator associated with each antenna, wherein the controller is configured to store calibration values to compensate for phase and gain offsets of the RF modulators and RF demodulators for a corresponding antenna and to apply gain and phase adjustments to respective transmit and receive signals in accordance with the calibration values.

7. The apparatus of claim 1, and further comprising a radio frequency (RF) modulator and an RF demodulator associated with each antenna, wherein the RF modulator is configured to upconvert a baseband transmit signal to a transmission frequency to produce the transmit signal and the RF demodulator is configured to downconvert the receive signal detected by its associated antenna, wherein each switch network is configured to, in the first switch mode, connect to an output of the RF modulator to couple the transmit signal to the gain block for its associated antenna, and in the second switch mode, to connect the amplified receive signal from the gain block for its associated antenna to an input of the RF demodulator for its associated antenna.

8. The apparatus of claim 1, wherein each switch network comprises first, second and third switches each comprising first, second and third terminals, the first terminal of the first switch being coupled to the associated antenna for the gain block, the first terminal of the second switch being coupled to an input to the gain block, the first terminal of the third switch being coupled to an output of the gain block, the second terminal of the first switch being coupled to the second terminal of the second switch and the third terminal of the first switch being coupled to the second terminal of the third switch, the third terminal of the second switch being coupled to receive the transmit signal and the third terminal of the third switch being coupled to output the amplified receive signal.

9. A method comprising:
    providing a plurality of antennas coupled to a processor via respective transmit signal paths and via respective receive signal paths;
    in a transmit mode, amplifying with each of a plurality of gain blocks corresponding ones of a plurality of transmit signals from the processor to produce amplified transmit signals to be transmitted substantially simultaneously by respective ones of the plurality of antennas, such that at least a first amplifier of each gain block lies in the transmit signal path between the processor and the respective antenna; and
    in a receive mode, amplifying with each of the plurality of gain blocks corresponding ones of a plurality of receive signals detected by respective ones of the plurality of antennas to produce amplified received signals such that at least the first amplifier of each gain block lies in the receive signal path between the respective antenna and the processor.

10. The method of claim 9, and further comprising controlling each of the plurality of gain blocks to operate according to a first gain level in the transmit mode and to operate according to a second gain level in the receive mode.

11. The method of claim 10, wherein the second gain level is greater than the first gain level.

12. The method of claim 9, and further comprising, in the transmit mode, coupling a plurality of transmit signals from outputs of corresponding ones of a plurality of radio frequency (RF) modulators to inputs of respective ones of the plurality of gain blocks and coupling amplified transmit signals output from the plurality of gain blocks to respective ones of the plurality of antennas, and in the receive mode, coupling a plurality of receive signals to inputs of respective ones of the plurality of gain blocks and coupling amplified receive signals output from the plurality of gain blocks to inputs of respective ones of a plurality of RF demodulators.

13. The method of claim 10, and further comprising, in the transmit mode, coupling an attenuator element in a signal path of each gain block so as to produce the first gain level and in the receive mode, removing the attenuator element in the signal path of each gain block so as to produce the second gain level.

14. The method of claim 9, and further comprising storing calibration values to compensate for phase and gain offsets of a radio frequency (RF) modulator and an RF demodulator associated with each antenna, and applying gain and phase adjustments to respective transmit signals in accordance with the calibration values in the transmit mode and to respective receive signals in accordance with the calibration values in the receive mode.

15. An apparatus comprising:
a plurality of antennas;
a front-end module associated with a corresponding one of the plurality of antennas, each front-end module comprising:
a radio frequency (RF) modulator configured to modulate a baseband transmit signal to produce an RF transmit signal for transmission via an associated antenna;
an RF demodulator configured to demodulate an RF receive signal from the associated antenna to produce a baseband receive signal;
a gain circuit configured to amplify the RF transmit signal or the RF receive signal and comprising at least a first amplifier, wherein the gain circuit is configured to operate in either of first and second gain modes, wherein in the first gain mode the gain circuit is configured to amplify the RF transmit signal with a first gain to produce an amplified RF transmit signal to be transmitted from the associated antenna and in the second gain mode is configured to amplify with a second gain the RF receive signal to produce an amplified RF receive signal;
a switch network configured to be coupled to an input of the gain circuit and to an output of the gain circuit, wherein the switch network is configured to operate in either a first switch mode or a second switch mode, wherein in the first mode, the switch network is configured to couple the RF transmit signal from the RF modulator to an input of the gain circuit and to couple the amplified RF transmit signal from the output of the gain circuit to the associated antenna such that the first amplifier of the gain circuit lies in a transmit signal path between the RF modulator and the associated antenna, and in the second mode, the switch network is configured to couple the RF receive signal from the associated antenna to the input of the gain circuit and to couple the amplified RF receive signal from the output of the gain circuit to an input of the RF demodulator such that the first amplifier of the gain circuit lies in a receive signal path between the associated antenna and the RF demodulator; and
a controller configured to control the gain circuit and the switch network in each of the plurality of front-end modules, wherein in a transmit mode the controller is configured to control each of the gain circuits in the front-end modules to operate in the first gain mode and to control each of the switch networks in the front-end modules to operate in the first switch mode so as to transmit a plurality of amplified RF transmit signals substantially simultaneously from the plurality of antennas, and in a receive mode the controller is configured to control each of the gain circuits in the front-end modules to operate in the second gain mode and to control each of the plurality of switch networks in the front-end modules to operate in the second switch mode so as to amplify a plurality of RF receive signals received by the plurality of antennas.

16. The apparatus of claim 15, wherein each gain circuit is configured to generate the first gain in the first gain mode that is less than the second gain generated in the second gain mode.

17. The apparatus of claim 16, wherein each gain circuit further comprises an attenuator element and a gain switch configured to selectively connect the attenuator element into and out of a signal path of the gain circuit, and wherein the gain switch in each gain circuit is configured to selectively connect the attenuator element into or out of the signal path of the gain circuit depending on whether the gain circuit is in the first gain mode or second gain mode.

18. The apparatus of claim 15, wherein each gain circuit further comprises an attenuator element, at least a second amplifier, and a gain switch configured to selectively connect the attenuator element into and out of a signal path of the gain circuit, and wherein the gain switch is configured to selectively connect the attenuator between the first and second amplifiers depending on whether the gain circuit is in the first gain mode or second gain mode.

19. The apparatus of claim 15, wherein the controller is configured to store calibration values to compensate for phase and gain offsets of the RF modulator and RF demodulator within each front-end module, and to apply gain and phase adjustments to respective baseband transmit signals and baseband receive signals based on the calibration values.

20. The apparatus of claim 15, wherein each switch network comprises first, second and third switches each comprising first, second and third terminals, the first terminal of the first switch being coupled to the associated antenna for the front-end module, the first terminal of the second switch being coupled to the input to the gain circuit, the first terminal of the third switch being coupled to the output of the gain circuit, the second terminal of the first switch being coupled to the second terminal of the second switch and the third terminal of the first switch being coupled to the second terminal of the third switch, the third terminal of the second switch being coupled to an output of the RF modulator and the third terminal of the third switch being coupled to an input of the RF demodulator.

21. The apparatus of claim 1, wherein the processor is configured to:

extract phase information from the receive signals received from the plurality of antennas;
generate inverted phases from the phase information; and
apply the inverted phases to respective transmit signals for the plurality of antennas.

22. The method of claim 9, further comprising:
extracting phase information from the receive signals received from the plurality of antennas;
generating inverted phases from the phase information; and
applying the inverted phases to respective transmit signals for the plurality of antennas.

23. The apparatus of claim 15, and further comprising a processor configured to:
extract phase information from the RF receive signals received from the plurality of antennas;
generate inverted phases from the phase information; and
apply the inverted phases to respective RF transmit signals for the plurality of antennas.

* * * * *